United States Patent [19]
Parkinson, Jr. et al.

[11] 3,835,122
[45] Sept. 10, 1974

[54] NOVEL POLYSTYRENE PRODUCT HAVING RAPID-POST-IRRADIATION DECAY OF CONDUCTIVITY AND PROCESS OF MAKING SAME

[75] Inventors: William W. Parkinson, Jr., Kingston; Minton J. Kelly, Oak Ridge; Bernard J. Sturm, Oak Ridge; William J. Martin, Oak Ridge, all of Tenn.

[73] Assignee: The United States of America as represented by the United States Atomic Energy Commission, Washington, D.C.

[22] Filed: Apr. 25, 1973

[21] Appl. No.: 354,265

[52] U.S. Cl. ... 260/78.5 T, 260/29.6 PM, 260/86.7, 260/88.1 PC
[51] Int. Cl. ............................................. C08f 27/04
[58] Field of Search 260/88.1 PC, 78.5 T, 78.5 HC, 260/86.7, 29.6 PM, DIG. 17, DIG. 21

[56] References Cited
UNITED STATES PATENTS

| | | | |
|---|---|---|---|
| 2,968,637 | 1/1961 | Bowers | 260/4 |
| 3,180,843 | 4/1965 | Dickerson | 260/30.6 |
| 3,268,489 | 8/1966 | Dial | 260/78.5 |

*Primary Examiner*—Joseph L. Schofer
*Assistant Examiner*—John Kight
*Attorney, Agent, or Firm*—John A. Horan; David S. Zachry; Irving Barrack

[57] ABSTRACT

The described invention relates to a process for modifying the post-irradiation conductivity of polystyrene comprising forming a copolymer between styrene monomer and no more than 3 weight percent, based on the weight of styrene monomer, of a monomer containing polar groups, said monomer being selected from the group consisting of reactive carboxylic acids and esters, reactive acid anhydrides, or vinyl esters; mixing the resultant copolymer with an aqueous emulsion, rendering the emulsion slightly basic by addition of an alkali metal hydroxide; separating the copolymer from the emulsion; and drying the separated copolymer.

10 Claims, No Drawings

NOVEL POLYSTYRENE PRODUCT HAVING RAPID-POST-IRRADIATION DECAY OF CONDUCTIVITY AND PROCESS OF MAKING SAME

BACKGROUND OF THE INVENTION

The invention described herein was made in the course of, or under, a contract with the U.S. Atomic Energy Commission and under an interagency agreement with the Office of Civil Defense.

The present invention relates to and has for a principal object to provide a novel polystyrene product having rapid post-irradiation decay of conductivity and to a process for making said product.

A critical component in the construction of certain radiation dosimeters, such as pocket-size quartz-fiber dosimeters, which determines the electrical performance of such devices, usually consists of a polystyrene film and metallic foil capacitor which serves as a charge storage device supplementing the capacitance of the ionization chamber. This capacitor is required in high range dosimeters because of the limitations on the capacitance imposed by their size and geometry. Obviously, electrical leakage from the film will result in erroneous readings of radiation dose. Ideally, the electrical conductance of the polymer film as capacitor dielectric should be zero both before and after irradiation. It must be suitable for processing into thin film of the order of 0.001 inch thick, of a high degree of uniformity. In addition, the electrical properties of the film must be insensitive to moisture. This requirement, coupled with low dielectric charging, suggests that nonpolar polymers, i.e., those containing little to no ionic or polar impurities, would be favorable resistance or insulation films. A most serious and intractable problem associated with dosimeter insulators is their persistent electrical conductivity following exposure to radiation. During irradiation the conduction of the plastic, functioning as a capacitor dielectric, will occur in parallel with the ionization chamber of the dosimeter. This charge transfer will contribute to the discharge of the total dosimeter (i.e., chamber +capacitor) and can be accounted for in the calibration of the dosimeter. In contrast, leakage from the plastic after exposure to radiation can lead to significant error.

It is accordingly a specific object of this invention to provide a plastic insulator having reduced magnitude and duration of conductivity following irradiation.

A further object is to provide such a material in film form.

SUMMARY OF THE INVENTION

We have found that post-irradiation conductivity can be effectively suppressed in polystyrene formations by effecting a distrubution of certain polar groups in ionized form along the polymer chain by copolymerization of styrene with selected acids, acid anhydrides, or organic esters, then incorporating a highly dispersed hydrated emulsifier phase in the resulting copolymer, and finally forming the desired physical shape from the dried copolymer. The effective polar groups for the purposes of this invention are carboxyl and hydroxyl groups existing in an alkali metal salt form homogeneously distributed within an amorphous matrix of styrene copolymer. Carboxyl or hydroxyl groups can be incorporated into a polystyrene copolymer product by conventional free radical initiated copolymerization reactions between styrene monomer and controlled amounts of selected organic acids, acid anhydrides, or vinyl esters. Only small concentrations of acid, anhydride, or vinyl ester are required to impart the desired electrical properties in the final product. Generally, at least 0.2 weight percent (based on the weight of styrene monomer) is required to suppress post-irradiation conductivity. A concentration of more than 3 percent should not be exceeded since it can result in excessive conductance, i.e., dielectric charging, even in the absence of radiation. Among the monomers which may be used to position carboxylic groups along the styrene copolymer chain are methacrylic acid, acrylic acid, methyl methacrylate, and methyl acrylate. Monomers with dicarboxylic acid groups can also be used such as maleic anhydride, dimethyl maleate, glutaconic anhydride, and dimethyl glutaconate. Hydroxyl groups can be placed along the polystyrene chain by copolymerization of styrene with such monomers as vinyl acetate, vinyl butyrate, or other vinyl esters. A free radical initiator is added to the styrene-comonomer mixture in an amount of from 0.01 to 0.03 weight percent of the mixture. Suitable initiators may be selected from such representative compounds as dibenzoyl peroxide, azo-bis-isobutylonitrile, tertiary butyl hydroperoxide, and ditertiary butyl peroxide.

After sweeping out oxygen by purging with nitrogen, the reaction mixture is heated and maintained at about 100°C. with constant stirring for about 72 hours. The temperature is then raised and maintained at 170°C. for 6 hours. The reaction mixture is then discharged from the reaction vessel and cooled to room temperature.

After the polymer has been synthesized, the novel and essential feature of this invention is accomplished; namely, the incorporation of a polar second phase comprising emulsifier and associated water. This incorporation is performed with the required uniformity and degree of dispersal by means of the following procedure.

The polymer is dissolved in an organic solvent such as benzene to give a 3 to 10 weight percent solution. The organic solution is stirred with a dilute aqueous solution of an emulsifier or detergent to form an emulsion. Among the emulsifiers suitable for this purpose are sodium stearate, dodecyl phenyl sodium sulfonate, decyl naphthyl sodium sulfonate, or hexyl decyl phenyl sodium sulfonate sufficient to form a 0.05 percent aqueous emulsion. A commercially available detergent formulation, Acto 450, a product of the Esso Standard Oil Company, typically consisting essentially of 45 percent dodecyl phenyl sodium sulfonate, 25 percent mineral oil, 15 percent isopropanol, and 15 percent water has also been found to be effective. A polymer emulsion is prepared by vigorously stirring approximately one volume of benzene solution of copolymer into two volumes of aqueous emulsifier solution.

The resultant polymer emulsion is neutralized and made slightly basic with adequate alkali hydroxide solution to convert the acid or ester radicals to salt form whereupon the organic solvent is removed by distillation and the polymer is collected from the mixture as described below.

In order to remove water and water-soluble impurities, the emulsion is broken by freezing. The frozen mass is then mixed with cold, distilled water near 0°C., filtered, and washed at low temperature until the wash water is no longer alkaline. Insulator films can then be prepared by solution casting from a 20–30 percent solution of the styrene-copolymer in benzene or by extrusion of the dry copolymer. Another method for collecting polymer from the emulsion is by simple evaporation of the aqueous phase. However, the freeze-thaw cycling followed by washing and filtering reduces the amount of residual emulsifier and water-soluble impurities to a lower level. Polymers collected from the freeze-thaw cycling procedure produce a less moisture-sensitive film with good electrical properties.

A sensitive measurement of very high values of resistance is required to indicate the suitability of polymer films for use as insulation in dosimeters. An electrical circuit for measurement of apparent conductivity and to determine suitability of the polymer films of this invention consisted of a source of known voltage and an amplifier with a known and very high input resistance for measurement of low currents. The potential source consisted of mercury batteries, a divider network providing 5–100 volts, a potential reversing switch, and an RC noise filter. The electrometer amplifier was a vibrating reed type, Cary Model 401, with input resistances of $10^8$ to $10^{13}$ ohms.

Electrical measurements were made at atmospheric pressure in a test chamber containing a drying agent to eliminate atmospheric moisture. Test specimens were typically 0.001 inch thick with electrodes of 3 to 6 square inches in area to provide sufficient current for convenient measurement. A detailed description of the measuring circuit and the procedure used in making measurements is found in ORNL-4842, a publication of the Oak Ridge National Laboratory, Oak Ridge, Tennessee. For the purposes of this invention, a polymer film having a conductance/capacitance ratio of less than $7 \times 10^{-7}$ mho/farad as measured $10^4$ seconds after irradiation to 2000 rads (at a rate of 2000 rads/minute) has a post-irradiation decay rate suitable for use in dosimeters.

EXAMPLE

Styrene-based copolymers having carboxyl groups derived from copolymerization of styrene with methacrylic acid or maleic anhydride were prepared in accordance with the general procedure described above. The carboxylic acid form was converted to a sodium salt in one case and a potassium salt in another. Copolymerization was effected with ditertiary butyl peroxide initiator and emulsions were formed using Acto 450. Film specimens were prepared from the copolymer by casting from a benzene solution. Typical results are summarized in the table below.

make them useful as dosimeter insulator components. The apparent role of the polar groups along the sryrene copolymer chain is to facilitate dispersion of a secondary ionic phase through association with the emulsified phase. Proper dispersal requires neutralized polar groups (salt forms of carboxyl or hydroxyl groups) attached directly along the polymer chain as indicated by the non-homogeneity obtained by mixing nonpolar polystyrene with an aqueous emulsion.

Improvements in post-irradiation decay require not only the existence of polar groups along the polystyrene chain in salt form, but the association of such polar forms with a homogeneous polar phase such as is obtained by the association of the polar form of polystyrene with an emulsified phase. Thus, simple addition of an aqueous emulsion to nonpolar polystyrene or polymerization of nonpolar polystyrene in an aqueous emulsion serves to increase rather than decrease the general level of conductivity. Un-neutralized polar groups such as carboxyl or hydroxyl give inadequate post-irradiation suppression of conductivity. But when the polar groups along the polymer chain are neutralized to form an alkali salt and combined with an emulsified phase, the separated dry polymer yields the desired post-irradiation electrical properties. Post-irradiation conductivity does not appear to be controlled by the nature of the emulsifier used. The only caveat to be noted here is that care should be exercised in forming the dry copolymer from the emulsion to ensure than an excess residuum of emulsifier is not carried along.

While the mechanism involved in inducing the desired post-irradiation conductivity decay is not clearly understood, it can be viewed as occurring by virtue of the uniformly dispersed polar second phase through the polymer forming trapping or recombination sites. Conductivity after irradiation of polystyrene and styrene-based polymers is attributed to electrons or positive holes. Reduction or decay of conductivity after irradiation is thought to occur by elimination of charge carriers either by trapping or recombination with oppositely charged species. Trapping or recombination sites are visualized as formed by the polar second phase uniformly dispersed through the copolymer containing neutralized polar groups along its chain.

What is claimed is:

1. A process for modifying the post-irradiation conductivity of polystyrene comprising:
   a. forming a copolymer between styrene monomer and no more than 3 weight percent, based on the weight of styrene monomer, of a monomer contain-

TABLE

Styrene-Based Polymers Having Various Polar Groups: Electrical Properties After Irradiation

| Sp. No. | Copolymer or Other Compound | Polar Groups | Copol. Conc., wt. % | Conductance/Capacitance Ratio* (Mhos/Farad) | | |
|---|---|---|---|---|---|---|
| | | | | Time after Irradiation | | |
| | | | | $10^3$ sec | $10^4$ sec | $10^5$ sec |
| 1 | Methacrylic | $-COOK^+$ | 1.0 | $70 \times 10^{-7}$ | $6 \times 10^{-7}$ | $1.1 \times 10^{-7}$ |
| 2 | Maleic Anh. | do. | 0.6 | $8.4 \times 10^{-7}$ | $0.8 \times 10^{-7}$ | $0.1 \times 10^{-7}$ |
| 3 | do. | $-COONa^+$ | 0.5 | $70 \times 10^{-7}$ | $5.4 \times 10^{-7}$ | $1.6 \times 10^{-7}$ |
| 4 | do. | do. | 0.5 | $34 \times 10^{-7}$ | $4.6 \times 10^{-7}$ | $1.8 \times 10^{-7}$ |
| 5 | do. | do. | 0.5 | $96 \times 10^{-7}$ | $4.8 \times 10^{-7}$ | $1.4 \times 10^{-7}$ |

*Note: To obtain conductivity in mho/cm, multiply by $2 \times 10^{-13}$ farad/cm.

It will be seen that the post-irradiation conductivity of such films showed a sufficiently rapid decay as to ing polar groups, said monomer being selected from the group consisting of reactive carboxylic acids and esters, reactive acid anhydrides, or vinyl esters;

b. mixing the resultant copolymer with an aqueous emulsion, rendering the emulsion slightly basic by addition of an alkali metal hydroxide;

c. separating the copolymer from the emulsion; and d. drying the separated copolymer.

2. The process according to claim 1 wherein the carboxylic acid is acrylic acid.

3. The process according to claim 1 wherein the carboxylic acid is methacrylic acid.

4. The process according to claim 1 wherein the carboxylic ester is methyl acrylate.

5. The process according to claim 1 wherein the carboxylic ester is methyl methacrylate.

6. The process according to claim 1 wherein the acid anhydride is selected from the group consisting of maleic anhydride and glutaconic anhydride.

7. The process according to claim 1 wherein the carboxylic ester is selected from the group consisting of dimethyl maleate and dimethyl glutaconate.

8. The process according to claim 1 wherein the emulsion is formed from a dilute aqueous solution of sodium stearate, dodecyl benzene, sodium sulfonate, decyl naphthyl sodium sulfonate, hexyl decyl phenyl sodium sulfonate, or Acto 450.

9. The process according to claim 1 wherein the separated copolymer is converted to a film.

10. The product resulting from the process of claim 1.

* * * * *